(12) United States Patent
Kim et al.

(10) Patent No.: US 8,537,909 B2
(45) Date of Patent: Sep. 17, 2013

(54) METHOD FOR TRANSMITTING SIGNALS USING HARQ SCHEME TO GUARANTEE CONSTELLATION REARRANGEMENT GAIN

(75) Inventors: Bong Hoe Kim, Gyeonggi-do (KR); Dong Youn Seo, Gyeonggi-do (KR); Dae Won Lee, Gyeonggi-do (KR); Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 12/811,372

(22) PCT Filed: Jan. 8, 2009

(86) PCT No.: PCT/KR2009/000085
§ 371 (c)(1),
(2), (4) Date: Jun. 30, 2010

(87) PCT Pub. No.: WO2009/088226
PCT Pub. Date: Jul. 16, 2009

(65) Prior Publication Data
US 2010/0284490 A1 Nov. 11, 2010

Related U.S. Application Data

(60) Provisional application No. 61/019,605, filed on Jan. 8, 2008.

(30) Foreign Application Priority Data
Dec. 29, 2008 (KR) .................. 10-2008-0135489

(51) Int. Cl.
*H04L 27/28* (2006.01)
*H04L 27/36* (2006.01)

(52) U.S. Cl.
USPC ............................................. 375/260; 375/298

(58) Field of Classification Search
USPC .................................. 375/260, 267, 298, 299
See application file for complete search history.

(56) References Cited

U.S. PATENT DOCUMENTS

| | | | |
|---|---|---|---|
| 8,189,559 B2 * | 5/2012 | Pi et al. ........................ | 370/351 |
| 2005/0249163 A1 | 11/2005 | Kim et al. | |
| 2005/0250454 A1 * | 11/2005 | Sebire et al. ............... | 455/67.11 |
| 2006/0251185 A1 * | 11/2006 | Von Elbwart et al. ........ | 375/298 |
| 2007/0211660 A1 * | 9/2007 | Teague .......................... | 370/329 |
| 2008/0320353 A1 * | 12/2008 | Blankenship et al. ........ | 714/746 |
| 2009/0147724 A1 * | 6/2009 | Nimbalker et al. .......... | 370/315 |

FOREIGN PATENT DOCUMENTS

| KR | 1020030091243 | 12/2003 |
|---|---|---|
| KR | 1020060051682 | 5/2006 |

* cited by examiner

*Primary Examiner* — David B. Lugo
(74) *Attorney, Agent, or Firm* — Lee, Hong, Degerman, Kang & Waimey

(57) ABSTRACT

A method for transmitting signals using a hybrid automatic repeat request (HARQ) scheme to guarantee a constellation rearrangement gain having a predetermined level or more is provided. Predetermined code blocks are encoded, sub-block interleaving is performed with respect to the encoded code blocks, and the sub-block interleaved code blocks are transmitted according to redundancy version (RV) start locations of the sub-block interleaved code blocks. The RVs are set such that the order of bit streams modulated by an M-QAM (M>4) scheme is changed upon a retransmission. In addition, the RVs are set such that the RV start locations applied to code blocks having different sizes are different.

6 Claims, 4 Drawing Sheets

FIG. 5

16QAM symbol constellation bits : $i_1\ i_2\ q_1\ q_2$

RV(0)　　　　RV(1)　　　　　RV(2)　　　　　RV(3)

| A { | $i_1$ | $i_2$ | $q_1$ | $q_2$ |
| | $i_2$ | $q_1$ | $q_2$ | $i_2$ |
| | $q_1$ | $q_2$ | $i_1$ | $q_1$ |
| | $q_2$ | $i_1$ | $i_2$ | $i_1$ |
| | ⋮ | ⋮ | ⋮ | ⋮ |
| | | x  x | x  … | x  … |

(a)

A>B

RV(0)　　　　RV(1)　　　　　RV(2)　　　　　RV(3)

| A { | $i_1$ | $i_1$ | $i_1$ | $i_1$ |
| | $i_2$ | $i_2$ | $i_2$ | $i_2$ |
| | $q_1$ | $q_1$ | $q_1$ | $q_1$ |
| | $q_2$ | $q_2$ | $q_2$ | $q_2$ |
| | ⋮ | ⋮ | ⋮ | ⋮ |
| | | | x  … | |

(b)

METHOD FOR TRANSMITTING SIGNALS USING HARQ SCHEME TO GUARANTEE CONSTELLATION REARRANGEMENT GAIN

CROSS-REFERENCE TO RELATED APPLICATIONS

This application is the National Stage filing under 35 U.S.C. §371 of International Application No. PCT/KR2009/000085, filed on Jan. 8, 2009, which claims the benefit of earlier filing date and right of priority to Korean Application No. 10-2008-0135489, filed on Dec. 29, 2008, and also claims the benefit of U.S. Provisional Application Ser. No. 61/019,605, filed on Jan. 8, 2008.

TECHNICAL FIELD

The present invention relates to a method for transmitting signals using a hybrid automatic repeat request (HARQ) scheme to guarantee a constellation rearrangement gain in a mobile communication system.

BACKGROUND ART

In a general communication system, in order to enable a receiver to correct an error which occurs in a channel, information transmitted by a transmitter is transmitted after being coded using a forward error correction (FEC) code. The receiver demodulates the received signal, decodes the FEC code, and restores transmitted information. In such a decoding process, the error of the received signal which occurs in the channel is corrected. Although various kinds of FEC codes may be used, for example, a turbo encoder will be described in the following description.

The turbo encoder is constituted by a recursive systematic convolution encoder and an interleaver. When the turbo encoder is actually implemented, an interleaver for facilitating parallel decoding, such as quadratic polynomial permutation (QPP) interleaver, may be used. The QPP interleaver has excellent performance in only a specific data block size. The performance of the turbo encoder is improved as the size of the data block is increased. In an actual, communication system, for convenience of actual implementation, a data block having a predetermined size or more is divided into several small data blocks and encoding is performed.

Each of the divided small data blocks is called a code block. The code blocks generally have the same size. However, due to the limitation of the size of the QPP interleaver, one of the several code blocks may have a different size. In order to reduce the influence of a burst error generated upon a transmission using a wireless channel after performing an FEC coding process in the unit of code blocks having a predetermined interleaver size, interleaving may be performed. In addition, the interleaved information is transmitted after being mapped to an actual radio resource.

Since the amount of radio resource used for an actual transmission is constant, rate matching is performed with respect to the encoded code blocks. Generally, the rate matching is performed by puncturing or repetition. The rate matching may be performed in the unit of encoded code blocks like the wideband code division multiplexing access (WCDMA) of the 3$^{rd}$ generation partnership project (3GPP). Alternatively, the rate matching may be separately performed with respect to a systematic part and a parity part of each of the encoded code blocks. This is shown in FIG. 1.

FIG. 1 is a schematic view showing a process of encoding a code block, performing rate matching with respect to the encoded code block, and transmitting the code block.

In the example of FIG. 1, each code block may be divided into a systematic bit stream and two parity bit streams by turbo encoding. These bit streams are subjected to sub-block interleaving and are then subjected to circular buffer rate matching. FIG. 1 shows a method of dividing the code block into the systematic part and the parity part and performing sub-block interleaving. The interleaved information is transmitted in the unit of information having a predetermined size.

Meanwhile, a hybrid automatic repeat request (HARQ) technology is obtained by combining channel coding and an ARQ technology, and improves decoding performance by retransmitting a data block in which an error occurs and combining the retransmitted data block and a previously transmitted data block. The HARQ scheme may be classified according to regulations of a time point when a retransmission is performed, and may be classified into an asynchronous HARQ scheme in which the time point when the retransmission is performed is variable, and a synchronous HARQ scheme in which the time point when the retransmission is performed is fixed. The HARQ scheme may be classified into a chase combining (CC) scheme and an incremental redundancy (IR) scheme according to types of a redundancy version (RV) used for the retransmission. In the CC scheme, a gain of a signal-to-noise ratio (SNR) is obtained by transmitting the same data block as a previous transmission. In contrast, in the IR scheme, a coding gain is obtained by transmitting data including a redundancy version different from that of a previous transmission.

If the HARQ scheme is applied in a system using circular buffer rate matching shown in FIG. 1, the RVs specify transmission start points of data blocks in the circular buffer so as to implement the IR scheme. That is, the start points should be defined in the circular buffer by the number of RVs.

Meanwhile, if data is transmitted using an M-QAM (M>4) modulation scheme, the constellation of a QAM symbol is composed of log$_2$M bits. At this time, error performance is changed according to the bit locations in the symbol. That is, the error performance of a specific bit location may be more excellent than that of another specific bit location. In consideration of such a characteristic, if the locations of bits transmitted in a previous transmission are changed upon a retransmission of the HARQ system, a diversity gain is obtained and thus the error performance can be improved. This scheme is called a constellation rearrangement scheme. Although a constellation rearrangement gain can be mainly in the CC scheme, if a coding rate is low in the HARQ system using the IR scheme, many portions of the RVs overlap. Thus, even in this case, a gain can be obtained.

DISCLOSURE

Technical Problem

An object of the present invention devised to solve the problem lies on a method for transmitting signals to guarantee a constellation rearrangement gain having a predetermined level or more upon a retransmission in a mobile communication system for transmitting the signals using a HARQ scheme based on the above-described technology.

Technical Solution

The object of the present invention can be achieved by providing a method for transmitting signals using a hybrid automatic repeat request (HARQ) scheme, the method including: encoding a first code block and a second code block having different sizes; performing sub-block interleaving with respect to each of the encoded first code block and second code block; and transmitting the sub-block interleaved first and second code blocks according to redundancy version (RV) start locations of the first code block and the second code block, wherein a first RV of the first code block and a second RV of the second code block have different start locations.

At this time, the first RV and the second RV may be set to be started from different RV start locations of a plurality of RV start locations which are equally defined with respect to the first code block and the second code block. Alternatively, the start location of the second RV may be set by applying an offset having a predetermined size to the start location of the first RV.

If the HARQ scheme may be an asynchronous HARQ scheme, the first RV and the second RV may be shared between a transmitter and a receiver by signaling. If the HARQ scheme is a synchronous HARQ scheme, the first RV and the second RV may be previously decided between a transmitter and a receiver.

In addition, the first RV of the first code block and the second RV of the second code block may be set such that constellation rearrangement gains having a predetermined threshold or more are acquired with respect to both the sub-block interleaved first and second code blocks. In more detail, the first RV of the first code block and the second RV of the second code block may be set such that the order of bit streams modulated by an M-QAM (M>4) scheme is changed upon a retransmission with respect to both the sub-block interleaved first and second code blocks.

If the modulation is performed by the 16-QAM scheme, the first RV of the first code block and the second RV of the second code block may be set such that the order of bit streams modulated by a 16-QAM scheme is shifted by odd-numbered bits with respect to both the sub-block interleaved first and second code blocks.

In another aspect of the present invention, provided herein is a method for transmitting signals using a hybrid automatic repeat request (HARQ) scheme, the method including: encoding predetermined code blocks; performing sub-block interleaving with respect to the encoded code blocks; and transmitting the sub-block interleaved code blocks according to redundancy version (RV) start locations of the sub-block interleaved code blocks, wherein the RVs are set such that the order of bit streams modulated by an M-QAM (M>4) scheme is changed upon a retransmission.

If the M-QAM modulation scheme is a 16-QAM modulation scheme, the RVs may be set such that the order of bit streams modulated by the 16-QAM scheme is shifted by odd-numbered bits with respect to the sub-block interleaved code blocks upon a retransmission.

Advantageous Effects

According to the embodiments of the present invention, it is possible to guarantee a constellation rearrangement gain having a predetermined level or more upon a retransmission in a mobile communication system for transmitting signals using a HARQ scheme.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a view showing a case where a constellation rearrangement gain acquired by any one code block cannot be acquired by a code block having a different size with respect to code blocks having different sizes, according to an embodiment of the present invention.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

Hereinafter, the detailed description includes detailed matters to provide full understanding of the present invention. However, it will be apparent to those skilled in the art that the present invention can be carried out without the detailed matters. To prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

As described above, the present invention provides a method for transmitting signals to guarantee a constellation rearrangement gain having a predetermined level or more upon a retransmission in a mobile communication system for transmitting the signals using a HARQ scheme. A method for acquiring the constellation rearrangement gain while transmitting symbol bits modulated an M-QAM (M>4) scheme or a HARQ scheme will be described in detail.

Figure 1:
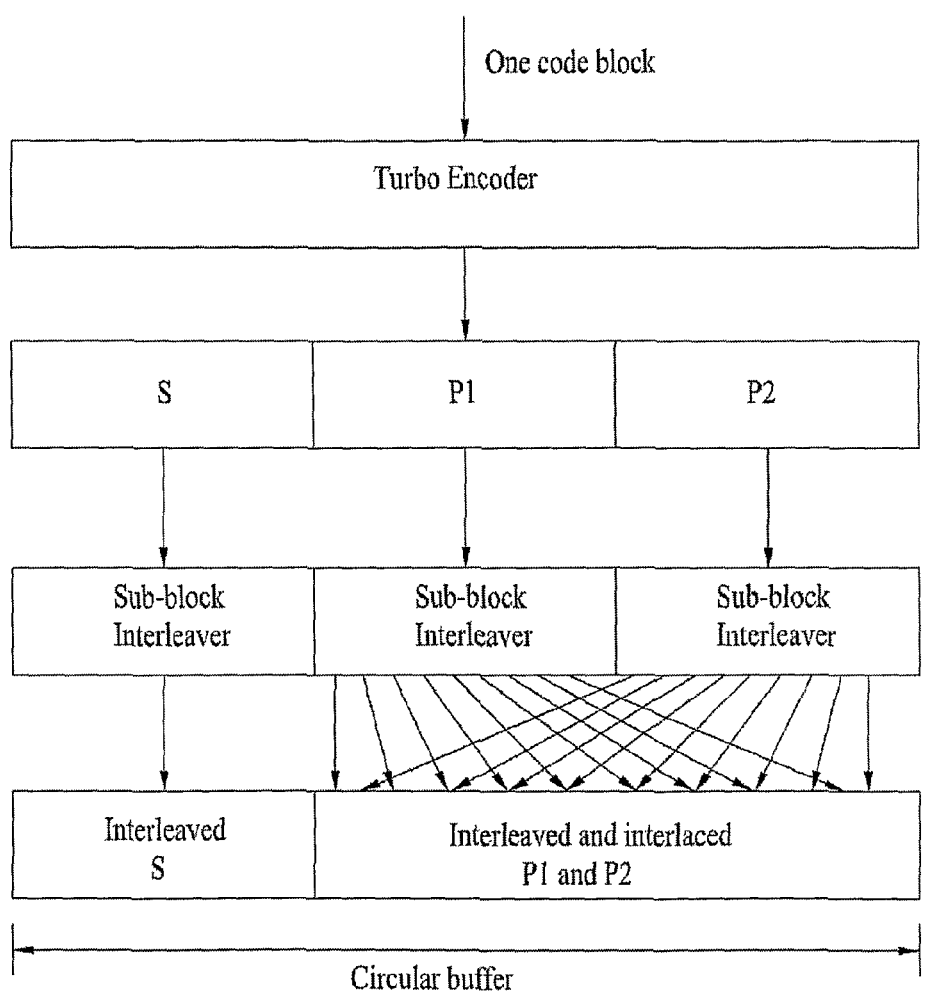
FIG. 1 is a schematic view showing a process of encoding a code block, performing rate matching with respect to the encoded code block, and transmitting the code block.
Figure 2:
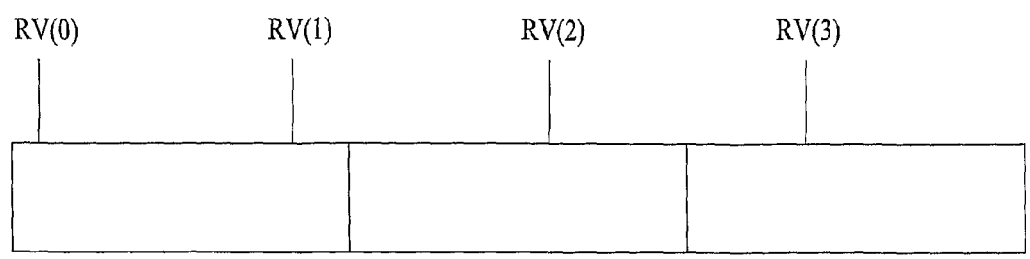
FIG. 2 is a view showing a start point of each redundancy version (RV) in a system using a circular buffer rate matching.

FIG. 2 is a view showing a start point of each redundancy version (RV) in a system using a circular buffer rate matching.

FIG. 2 shows a case where encoding is performed using a turbo encoder having a rate of ⅓ and the number of RVs is set to 4. Accordingly, a front ⅓ part is a systematic part and a rear ⅔ part is a parity part. The same principle is applicable even when the coding rate and the number of RVs are changed. In FIG. 2, it is assumed that the gap between the RVs is obtained by dividing the whole size of a circular buffer by the number of RVs.

The term "RV start point" or "RV start location" described herein may indicate the location of the circular buffer where information stored in the circular buffer is read as the information which will be transmitted according to the RV numbers upon an initial transmission and a retransmission. In addition, it is assumed that the "RV transmission start point"

indicates the location where the signals to be transmitted according to RV numbers are read from the circular buffer.

Meanwhile, the case where the symbol bits modulated by the M-QAM (M>4) scheme, for example, 16-QAM scheme, are transmitted after being subjected to the circular buffer rate matching will be described.

One symbol modulated by the 16-QAM scheme may be represented by 4-bit information as described above. Hereinafter, the 4-bit information is sequentially represented by i1, i2, q1 and q2. The location of one modulated symbol on a constellation may be decided by the 4-bit information. In the 3GPP LTE system, 16-QAM symbol constellation bits may be represented as follows.

TABLE 1

| i1 i2 q1 q2 | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

If the order of the four bits is changed when the four bits corresponding to one modulated symbol are retransmitted, the location of the symbol on the constellation is changed and thus a constellation arrangement gain can be acquired via a retransmission. In some cases, if the signals are transmitted after rate matching using the circular buffer, it may be difficult to acquire the constellation rearrangement gain.

Figure 3:
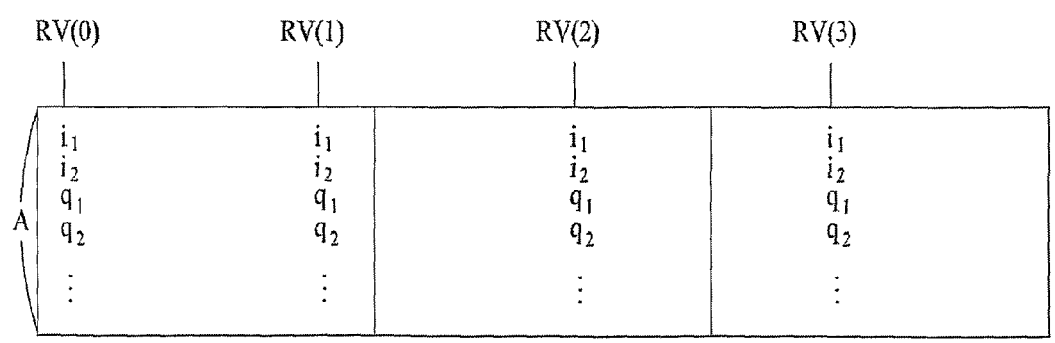
FIG. 3 is a view showing a case where a constellation rearrangement gain cannot be acquired by a retransmission when symbol bits modulated by a 16-QAM scheme are transmitted after being subjected to rate matching using a circular buffer.

FIG. 3 is a view showing a case where a constellation rearrangement gain cannot be acquired by a retransmission when symbol bits modulated by a 16-QAM scheme are transmitted after being subjected to rate matching using a circular buffer.

In more detail, FIG. 3 shows a case where, when the signals are read and transmitted from the circular buffer at four RV start points, all symbol bits modulated by the 16-QAM scheme are aligned in the same order and are transmitted. That is, when bit information corresponding to one modulated symbol is sequentially represented by i1, i2, q1 and q2 in the system using the 16-QAM modulation scheme, the bits are arranged at all the RV start locations in the same order and thus the constellation rearrangement gain cannot be acquired.

Accordingly, in one embodiment of the present invention, the RV start locations are set such that the bit information order of the modulated symbols is changed to guarantee the constellation rearrangement gain having a predetermined level or more.

Figure 4:
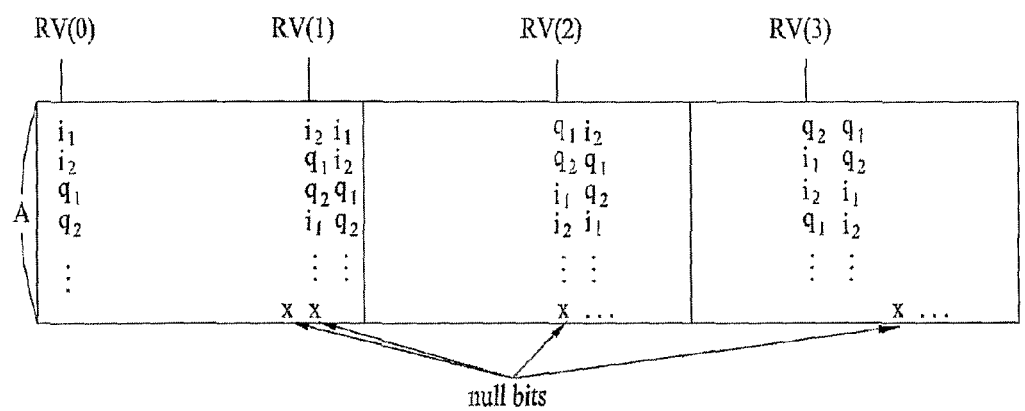
FIG. 4 is a view showing a case where RVs are set to guarantee a constellation rearrangement gain, according to an embodiment of the present invention.

FIG. 4 is a view showing a case where RVs are set to guarantee a constellation rearrangement gain, according to an embodiment of the present invention.

In more detail, bit streams corresponding to one 16-QAM modulated symbol are arranged in order of i1, i2, q1 and q2 and are transmitted at RV(0), and are arranged in order of i2, i1, q2 and q1 and are transmitted at RV(1), such that the location of the symbol on the constellation is changed upon a retransmission. This may be set by adjusting each RV start location in consideration of the bit arrangement of the modulated symbol.

Preferably, in one embodiment of the present invention, if the 16-QAM modulation scheme is used, the RV start locations are set such that the bit streams corresponding to one modulated symbol are shifted by odd-numbered bits upon the retransmission. Generally, in the case of using the 16-QAM scheme, if the bit streams are shifted by odd-numbered bits and are transmitted, a location having good performance and a location having bad performance are changed on the constellation. Therefore, a higher constellation rearrangement gain can be acquired compared with the case where the bit streams are shifted by even-numbered bits and are transmitted.

In FIGS. 3 and 4, the width A of the circular buffer is proportional to the size of the encoded codeword. In addition, if one codeword is encoded and is stored in the circular buffer and the size of the codeword is not accurately matched with one compartment of the circular buffer, a null bit may be inserted into a lower end of the circular buffer as shown in FIG. 4. Accordingly, even when the width A of the circular buffer is a multiple of 4, the bit streams corresponding to the symbol modulated by the 16-QAM scheme may not be arranged in the same order at all the RV start locations.

Meanwhile, if a data block (an information block or a transport block) transmitted from an upper layer has a specific size or more due to the limitation of a physical layer, for example, the limitation of the size of a QPP interleaver, the data block may be divided into several code blocks. In wideband code division multiple access (WCDMA), high-speed downlink packet access (HSDPA) or high-speed uplink packet access (HSUPA) system of the 3GPP, when the data block is divided into several code blocks, the sizes of the divided code blocks are identical. However, the sizes of the code blocks may be different according to a wireless communication system due to various reasons such as the limitation of the interleaver size or the like.

If several divided code blocks having different sizes are present in an IR scheme using circular buffer rate matching and the RV start points defined in FIG. 2 are equally applied to all the code blocks, since the sizes of the code blocks are different, the constellation rearrangement gains of the code blocks may be different. This will now be described in detail with respect to the drawing.

FIG. 5 is a view showing a case where a constellation rearrangement gain acquired by any one code block cannot be acquired by a code block having a different size with respect to code blocks having different sizes, according to an embodiment of the present invention.

For example, FIG. 5A shows a case where the RV start locations are set such that the modulated symbol bit arrangements are different with respect to the RV numbers in the system using the 16-QAM scheme as shown in FIG. 4. If the RVs are set as shown in FIG. 5A, the constellation rearrangement gain having a predetermined level or more can be acquired.

If the code blocks having the sizes different from those of the code blocks which are subjected to rate matching are transmitted with the same RV start location as shown in FIG. 5A, the constellation rearrangement gain cannot be acquired as shown in FIG. 5B. That is, with respect to a second code block having a second size different from a first size of a first code block applied like FIG. 5A, a degree that the order of symbol bit streams is changed according to RV start locations is decreased or the order of symbol bit streams may not be changed. In this case, since system performance is decided by a code block having a smallest constellation rearrangement gain, efficiency deteriorates.

Accordingly, in one embodiment of the present invention, if the sizes of the code blocks are different, the RV start locations are differently set according to the code blocks. In more detail, the following method is possible.

First, a method of applying an offset to the RV start locations of the code blocks having different sizes is possible. For example, in FIG. 5B, the offset may be applied to the start locations of RV(1), RV(2) and RV(3) such that the location in which the 16-QAM modulated symbol bit arrangement can be changed is set, a constellation rearrangement gain having a predetermined level or more can be acquired. In addition, a method of applying the offset to the RV start locations by x bits with respect to the first code block and applying the offset to the RV start locations by y bits with respect to the second code block having the size different from that of the first code block is also possible.

In addition, the RV numbers may be applied to the code blocks having different sizes in different orders upon an initial transmission and a retransmission. In more detail, it is assumed that, while the constellation rearrangement gain having the predetermined level can be acquired if RV(1) is transmitted after RV(0) is transmitted with respect to the first code block, the constellation rearrangement gain is hard to be acquired if RV(1) is transmitted after RV(0) is transmitted with respect to the second code block having the size different from that of the first code block. In addition, in the same example, it is assumed that, while the constellation rearrangement gain is not acquired if RV(1) is transmitted after RV(0) is transmitted with respect to the second code block, the constellation rearrangement gain having the predetermined level or more is acquired if RV(2) is transmitted after RV(0) is transmitted. In this case, since the constellation rearrangement gain is decided according to the second code block, the order of applying the RV numbers of the second code block may be differently applied For example, the RV numbers are applied in order of 0, 1, 2 and 3 with respect to the first code block and the RV numbers are applied in order of 0, 3, 2 and 1 with respect to the second code block such that similar constellation rearrangement gains can be acquired with respect to the both code blocks. If necessary, the RV numbers for the initial transmission may be differently set according to the code blocks.

In the 3GPP system, since an asynchronous HARQ scheme is used in the case of downlink, the RV information which will be used for the current transmission should be signaled via a downlink control channel. Accordingly, in the above-described embodiment, it is preferable that the RV start locations based on the codewords are transmitted between a transmitter and a receiver by signaling.

Meanwhile, in the 3GPP system, since a synchronous HARQ scheme is used in the case of uplink, the RVs which will be used for the current transmission may be signaled via a downlink control channel or predetermined RVs may be used. With respect to uplink, if the codeword-based RV information is received, the same scheme as the asynchronous HARQ scheme may be applied. If separate signaling is not performed with respect to the codeword-based RV information, the RV start locations and/or the applied RV patterns may be set to be previously decided and shared between the transmitter and the receiver.

If the number of kinds of code blocks having different sizes is 3 or more when the above-described method is applied to the transmission of downlink data or uplink data, the method which is applied when the number of kinds of code blocks is 2 as the above-described example is applicable.

Meanwhile, as described above, the signaling for sharing the RV information between the transmitter and the receiver may be transmitted together with a signal for informing whether or not the data block which is currently transmitted is a new data block. This may be called a new data indicator (NDI). Accordingly, a signaling method for explicitly representing the NDI and the RVs which are currently transmitted is possible.

Since both the transmitter and the receiver know a time point when the data block is transmitted in the synchronous HARQ, a retransmission sequence number (RSN) may be used instead of the NDI. At this time, it may be promised that a specific value of the RSN indicates the initial transmission.

For example, if the value "0" of the RSN is the initial transmission and the RSN is represented by 2 bits, the transmission of the RSN may be performed in order of 0, 1, 2 and 3 and the RSN may be continuously maintained at 3 after a fourth transmission. At this time, it is assumed that the RSN is transmitted from the transmitter to the receiver.

Hereinafter, a method for efficiently transmitting signals in the case where data and control information are simultaneously transmitted via the same channel according to another embodiment of the present invention will be described.

In the communication system, in some cases, data and control information are simultaneously transmitted via one physical channel. For example, the data and the control information are transmitted via a physical uplink shared channel (PUSCH) of the 3GPP LTE system. In this case, the control information is transmitted after performing rate matching with respect to a data part mapped to a physical resource or puncturing data.

If the data block is divided into several code blocks as described above, a detailed method of guaranteeing a resource for transmitting the control information in each code block is as follows.

First, a method of performing rate matching or puncturing with respect to each code block by the same amount in the entire control information is possible. That is, if the total amount of control information occupies 100 resource elements and the number of code blocks is 3, the resource elements are divided into a group of 33 resource elements, a group of 33 resource elements and a group of 34 resource elements such that a resource space for transmitting the control information is guaranteed. At this time, if the sizes of the code blocks are different, a small number of resource elements may be preferentially allocated to a code block having a small size.

As another embodiment of the present invention, a method of performing rate matching or puncturing with respect to the resource corresponding to the entire control information in inverse proportion to the sizes of the code blocks is possible.

As another embodiment of the present invention, if the control signal is multiplexed with the data using puncturing, a method of equally performing puncturing with respect to the code blocks of the resource allocated to the data regardless of the sizes of the code blocks is possible. That is, if the control information occupies 100 resource elements and 288 (24 resource elements×12 symbols) resource elements are allocated to the code blocks except a reference symbol, puncturing may be performed regardless of the sizes of the code blocks by arranging the control information to specific symbols.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The embodiments of the present invention are applicable to a $3^{rd}$ generation partnership project (3GPP)-based system and, more particularly, a 3GPP long term Evolution advanced (3GPP LTE-A) system. If a transmitter performs circular buffer rate matching with respect to information modulated by an M-QAM scheme and transmits the information, the same principle is applicable to other mobile communication systems.

The invention claimed is:

1. A method for transmitting signals using a hybrid automatic repeat request (HARQ) scheme, the method comprising:

encoding a first code block and a second code block having different sizes;

performing sub-block interleaving with respect to each of the first encoded code block and second encoded code block; and transmitting the sub-block interleaved first and second code blocks according to redundancy version (RV) start locations of the first code block and the second code block, wherein the RV start location of the first code block and the RV start location of the second code block are different, and wherein the RV start location of the second code block is set by applying an offset of a predetermined size to the RV start location of the first code block.

2. The method according to claim 1, wherein:
the HARQ scheme is an asynchronous HARQ; and
the RV start location of the first code block and the RV start location of the second code block are shared between a transmitter and a receiver in response to signaling.

3. The method according to claim 1, wherein:
the HARQ scheme is a synchronous HARQ scheme; and
the RV start location of the first code block and the RV start location of the second code block are previously determined between a transmitter and a receiver.

4. The method according to claim 1, wherein the RV start location of the first code block and the RV start location of the second code block are set such that constellation rearrangement gains having at least a predetermined threshold are acquired with respect to both the sub-block interleaved first and second code blocks.

5. The method according to claim 1, wherein the RV start location of the first code block and the RV start location of the second code block are set such that an order of bit streams modulated by an M-Quadrature Amplitude Modulation (M>4) scheme is changed upon a retransmission with respect to both the sub-block interleaved first and second code blocks.

6. The method according to claim 1, wherein the RV start location of the first code block and the RV start location of the second code block are set such that an order of bit streams modulated by a 16-Quadrature Amplitude Modulation scheme is shifted by odd-numbered bits with respect to both the sub-block interleaved first and second code blocks.

* * * * *